United States Patent
Park et al.

(10) Patent No.: US 8,326,301 B2
(45) Date of Patent: Dec. 4, 2012

(54) METHOD FOR SUPPORTING MOBILITY OF MOBILE TERMINAL, AND MOBILE TERMINAL THEREOF

(75) Inventors: Gi Won Park, Gyeonggi-do (KR); Yong Ho Kim, Gyeonggi-do (KR); Jin Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 12/681,365

(22) PCT Filed: Oct. 2, 2008

(86) PCT No.: PCT/KR2008/005827
§ 371 (c)(1),
(2), (4) Date: Apr. 1, 2010

(87) PCT Pub. No.: WO2009/045070
PCT Pub. Date: Apr. 9, 2009

(65) Prior Publication Data
US 2010/0216474 A1    Aug. 26, 2010

Related U.S. Application Data

(60) Provisional application No. 60/976,804, filed on Oct. 2, 2007.

(30) Foreign Application Priority Data

Nov. 19, 2007    (KR) ........................ 10-2007-0117978

(51) Int. Cl.
*H04W 36/00*    (2009.01)
(52) U.S. Cl. .................. 455/436; 455/435.3; 455/435.2; 455/434; 455/552.1
(58) Field of Classification Search ............... 455/435.3, 455/435.2, 436, 434, 552.1
See application file for complete search history.

(56) References Cited

U.S. PATENT DOCUMENTS

| | | |
|---|---|---|
| 2003/0224790 A1 | 12/2003 | Choi |
| 2006/0094452 A1 | 5/2006 | Kang |
| 2006/0160541 A1 | 7/2006 | Ryu |
| 2006/0251023 A1 | 11/2006 | Choi |
| 2007/0191015 A1* | 8/2007 | Hwang et al. .................. 455/442 |
| 2008/0056125 A1* | 3/2008 | Kneckt et al. ................. 370/229 |
| 2009/0067386 A1* | 3/2009 | Kitazoe ......................... 370/332 |

* cited by examiner

*Primary Examiner* — Kwasi Karikari
(74) *Attorney, Agent, or Firm* — Lee, Hong, Degerman, Kang & Waimey

(57) ABSTRACT

A method for supporting mobility of a mobile station and the mobile station which supports the mobility are disclosed. The method of supporting the mobility of the mobile station includes receiving cell reselection information and neighbor cell information from a base station (BS) of a present cell, wherein the cell reselection information includes thresholds for determining whether the quality of the other RAT cell shall be measured or not, wherein the neighbor cell information includes a frame duration code and a frame number of a downlink frame in the other RAT cell, wherein the frame duration code indicates the start preamble of the downlink frame; determining whether a mobile station (MS) shall measure the quality of the other RAT cell or not using the thresholds; and measuring the quality of the other RAT cell and reselecting a cell or transmitting the measured result to the BS through a measurement report message according to the measured result, if it is determined that the MS would measure the quality of the other RAT cell. Accordingly, since the mobility of the mobile station between the E-UTRAN network and the other RAT cell is supported, the mobile station can continuously receive a service while maintaining current service quality although a user moves to the other RAT cell.

13 Claims, 8 Drawing Sheets

FIG. 5A
| Preamble Index | Cell ID | segment | Series to modulate |
|---|---|---|---|
| 0 | 1 | 1 | 0xA6F294537B285E1844677D133E4D53CCB1F182DE00489E53E6B6E |
FIG. 5B
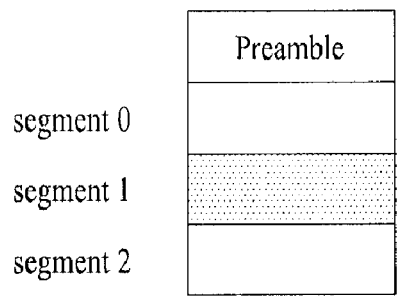
FIG. 5C
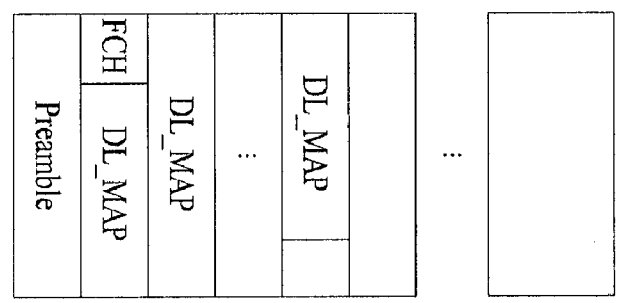

FIG. 6

| System Information Block 3 | System Information Block 5 |
|---|---|
| Information Elements<br>{<br>   Cell reselection information<br>} | Information Elements<br>{<br>   Neighbor cell information<br>} |
|  |  |
| Other information | Other information |

METHOD FOR SUPPORTING MOBILITY OF MOBILE TERMINAL, AND MOBILE TERMINAL THEREOF

CROSS-REFERENCE TO RELATED APPLICATIONS

This application is the National Stage filing under 35 U.S.C. §371 of International Application No. PCT/KR2008/005827, filed on Oct. 2, 2008, which claims the benefit of earlier filing date and right of priority to Korean Application No. 10-2007-0117978, filed on Nov. 19, 2007, and also claims the benefit of U.S. Provisional Application Ser. No. 60/976,804, filed on Oct. 2, 2007.

TECHNICAL FIELD

The present invention relates to a inter radio access technology (RAT), and more particularly, to a method for supporting mobility of a mobile station between an evolved UMTS terrestrial radio access (E-UTRAN) network which is provided in the 3rd Generation Partnership Project (3GPP) and the other RAT cell.

BACKGROUND ART

The inter RAT indicates a technology of allowing a mobile station to continuously receive a service, which is currently being used, even when a mobile station is moved from a network, in which the mobile station is registered, to the other RAT cell so as to improve the convenience of a user.

In the 3GPP network, as shown in FIGS. 1A and 1B, system information is transmitted. The system information may be transmitted using a system information block as shown in FIG. 1A or may be transmitted using a measurement control message as shown in FIG. 1B. A base station periodically transmits the system information block to a mobile station such that the mobile station knows information about a cell in which the mobile station is registered and a neighbor cell, for example, radio bearer information, physical channel information, and an attribute such as cell quality, and provides useful information such that the mobile station continuously receives a service from a present cell or the mobile station is moved to a cell having high quality.

In the technology of the 3GPP network, 15, 16 or 18 pieces of system information are respectively defined and used in a Global System for Mobile communication (GSM), a General Packet Radio Service (GPRS) and a Universal Mobile Telecommunication System (UMTS). Table 1 shows system information block types 4 using cell selection and reselection in a system information block used in the UMTS network. As shown in Table 1, the system information includes information elements including an individual parameter and various parameters, for example, cell selection and reselection information.

TABLE 1

| Information Element/Group name | Need | Type and reference |
| --- | --- | --- |
| UTRAN mobility information elements | | |
| Cell identity | Mandatory | Cell identity |
| Cell selection and re-selection info | Mandatory | Cell selection and re-selection info for SIB3/4 |
| Cell Access Restriction | Mandatory | Cell Access Restriction |

In the 3GPP network, cell measurement is performed as follows. The mobile station periodically measures the quality of a present cell or a neighbor cell, for example, an intra neighbor cell or an inter RAT neighbor cell, includes a measurement value in a measurement report message, and transmits the measurement report message to the base station. The base station which receives the measurement report message from the mobile station checks the value included in the message, compares the quality of the cell managed by the base station with the quality of the neighbor cell, and determines whether the mobile station shall stay in the present cell or shall be moved to the neighbor cell having the quality higher than that of the present cell. The measurement report message transmitted from the mobile station to the base station may be transmitted to the base station by a periodic method or an event-trigger method.

Currently, in the 3GPP inter-RAT, a technology of supporting mobility between other RAT cells in the same standard, for example, a technology of supporting mobility from a UMTS network defined in the 3GPP to a GSM network was developed.

However, a technology of supporting mobility between other RAT cells in different standards, for example, a technology of supporting mobility between an E-UTRAN network which is provided in the 3GPP and a World Interoperability for Microwave Access (WiMAX) network which is provided in the IEEE has not been developed.

DISCLOSURE

Technical Problem

An object of the present invention devised to solve the problem lies on a method for supporting mobility of a mobile station between an E-UTRAN network and the other RAT cell.

Another object of the present invention devised to solve the problem lies on a mobile station to which a method of supporting mobility of the mobile station is applied.

Technical Solution

The object of the present invention can be achieved by providing a method of supporting mobility between E-UTRAN network and the other RAT cell includes receiving cell reselection information and neighbor cell information from a base station (BS) of a present cell, wherein the cell reselection information includes thresholds, wherein the neighbor cell information includes downlink frame information of the other RAT cell; determining whether a mobile station (MS) shall measure the quality of the other RAT cell or not using the thresholds; and measuring the quality of the other RAT cell and reselecting a cell or transmitting the measured result to the BS through a measurement report message according to the measured result, if it is determined that the MS would measure the quality of the other RAT cell.

Preferably, the frame information included in the neighbor cell information may include a frame duration code indicating a downlink frame start preamble of the other RAT cell and a frame number of a downlink frame of the other RAT cell.

Preferably, the determining may include determining that the MS would measure the quality of the other RAT cell if the signal quality of a present cell is equal to or lower than a signal quality threshold or the Rx power strength of the present cell is equal to or lower than an Rx power strength threshold.

Preferably, the transmitting through the measurement report message may include adjusting, by the MS, the transmission frequency of the measurement report message using at least one of a hysteresis parameter or time-to-trigger parameter.

Preferably, the neighbor cell information may be used when any one of cell reselection or handover is performed with respect to the mobile station.

In another aspect of the present invention, provided herein is a method of supporting mobility between E-UTRAN network and the other RAT cell, the method including transmitting cell reselection information and neighbor cell information from a base station (BS) to a mobile station (MS) periodically, wherein the cell reselection information includes thresholds for determining whether the quality of the other RAT cell shall be measured or not, wherein the neighbor cell information includes a frame duration code and a frame number of a downlink frame in the other RAT cell, wherein the frame duration code indicates the start preamble of the downlink frame; at the MS, receiving a measurement report message which includes the result of measuring the quality of the other RAT cell according to the thresholds; and transmitting a command which indicates a handover of the MS according to the measured result.

Preferably, the neighbor cell information and the cell reselection information may be transmitted in a way that information elements are added to a system information block transmitted from the BS to the MS periodically.

Preferably, the cell reselection information and the neighbor cell information may be transmitted in a way that system information is added to a measurement control message transmitted from the BS to the MS periodically, and the system information includes the cell reselection information and the neighbor cell information.

Preferably, the neighbor cell information may further include at least one of bandwidth information and a preamble index. The bandwidth information indicates cell bandwidth size of the other RAT cell and the preamble index indicates a specific preamble of a physical layer in the other RAT cell.

In a further aspect of the present invention, provided herein is a mobile station supporting mobility between E-UTRAN network and other RAT, the mobile station including: system information receiving portion to receive cell reselection information and neighbor cell information from a base station (BS) of a present cell periodically, wherein the cell reselection information includes thresholds for determining whether the quality of the other RAT cell shall be measured or not, wherein the neighbor cell information includes a frame duration code and a frame number of a downlink frame in the other RAT cell, wherein the frame duration code indicates the start preamble of the downlink frame; quality measurement portion to measure the quality of other RAT cell if it is determined that the quality of the other RAT cell would be measured according to the thresholds; and measurement report portion to transmit a result of measuring the quality of the other RAT cell to the BS through a measurement report message.

Preferably, the quality measurement portion may measure the quality of the other RAT cell according to duration scheduled in a measurement gap registered in the MS and the BS if the mobile station is in an active mode.

Preferably, the mobile station may be a dual receiver which is able to receive signals of the E-UTRAN and the other RAT cell simultaneously.

ADVANTAGEOUS EFFECTS

According to an embodiment of the present invention, since the mobility of the mobile station between the E-UTRAN network and the other RAT cell is supported, the mobile station can continuously receive a service while maintaining current service quality although a user moves to the other RAT cell.

DESCRIPTION OF DRAWINGS

The accompanying drawings, which are included to provide a further understanding of the invention, illustrate embodiments of the invention and together with the description serve to explain the principle of the invention.

In the drawings:

FIG. 5A is a view showing a method for checking a code "series to modulate" according to preamble indexes.

FIG. 5B is a view showing a method for reading a preamble corresponding to a preamble index.

FIG. 5C is a view showing an example of the structure of a WiMAX frame associated with FIG. 5B.

FIG. 6 is a view showing an example of the structure of a system information block according to the present invention.

MODE FOR INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced.

Figure 1A:
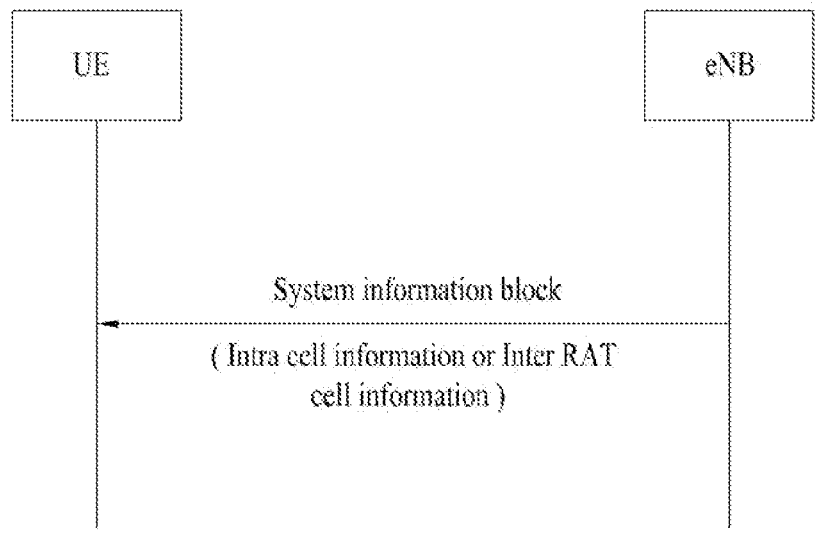
FIGS. 1A and 1B are views showing a conventional scheme of transmitting system information from a base station to a mobile station.
Figure 1B:
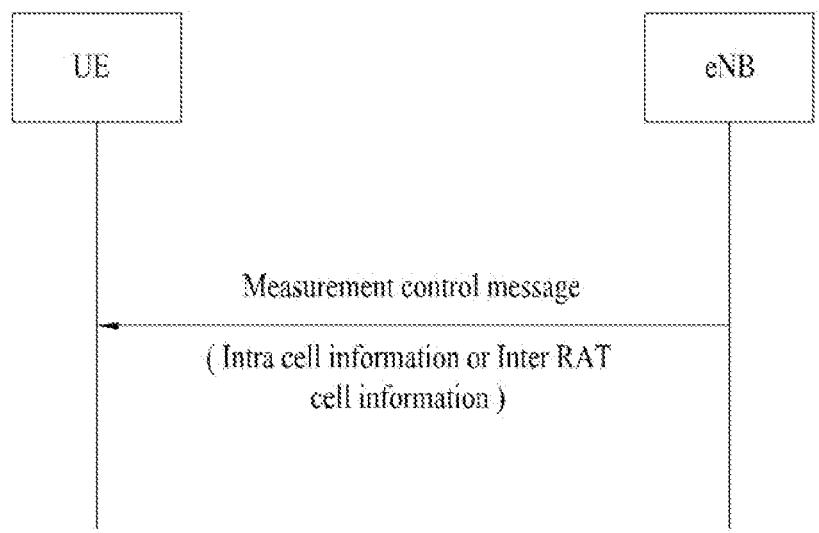
Figure 2:
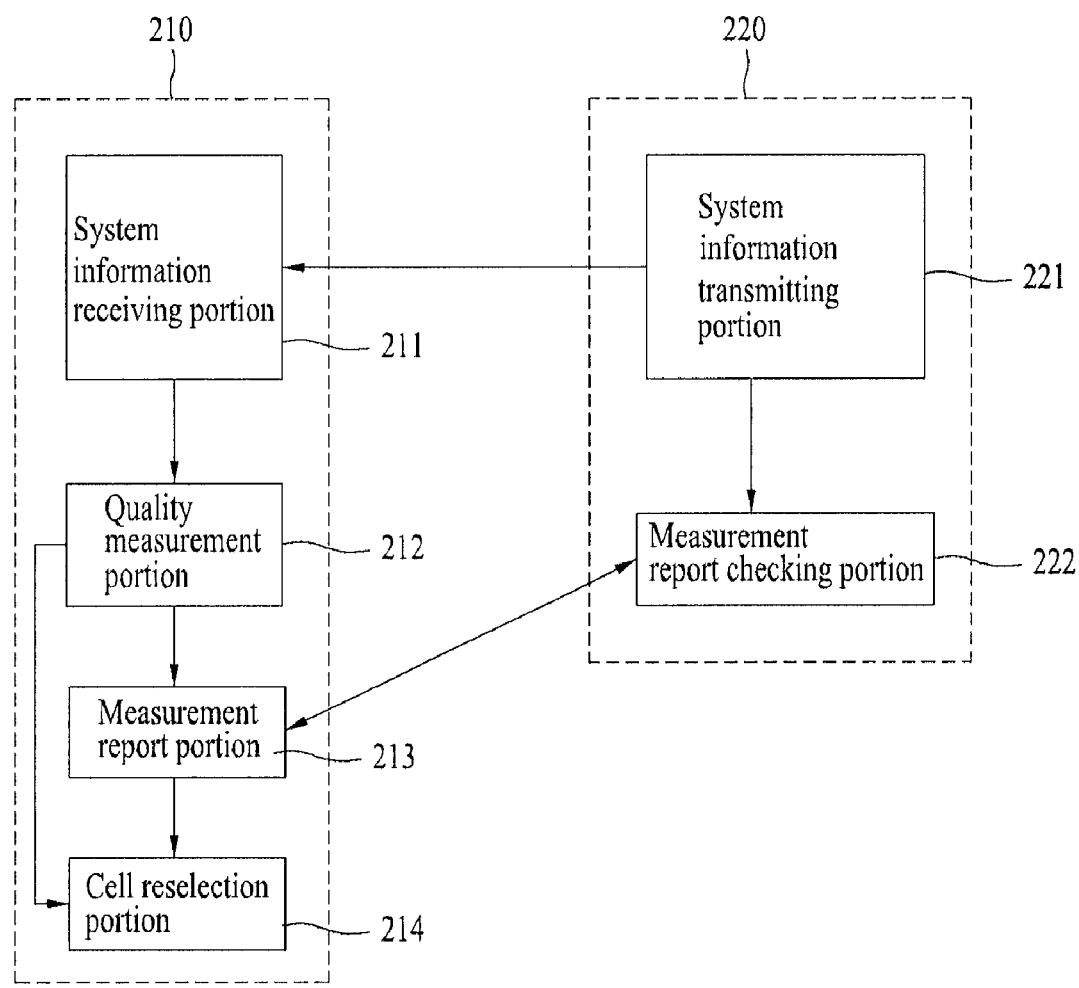
FIG. 2 is a view showing a base station and a mobile station in an E-UTRAN network according to an embodiment of the present invention.

FIG. 2 is a view showing a base station 220 and a mobile station 210 in an E-UTRAN network according to an embodiment of the present invention.

The mobile station 210 of FIG. 2 includes a system information receiving portion 211, a quality measurement portion 212, a measurement report portion 213 and a cell reselection unit 214.

The system information receiving portion 211 receives neighbor cell information and cell reselection information from the base station 220 of a present cell. The neighbor cell information includes downlink frame information of the other RAT cell and the cell reselection information includes thresholds for determining whether or not the quality of the other RAT cell shall be measured. The neighbor cell information transmitted from the base station 220 to the mobile station may include bandwidth information indicating a cell bandwidth size of the other RAT cell and a preamble index indicating a specific preamble of a physical layer in the other RAT cell.

The quality measurement portion 212 measures the quality of the other RAT cell while the signal of the other RAT cell is received, if it is determined that the quality of the other RAT cell is measured according to the thresholds. At this time, if the mobile station 210 is a single receiver, the quality measurement portion 212 may be configured to measure the quality of the other RAT cell according to a measurement gap. In contrast, if the mobile station 210 is a dual receiver, the quality measurement portion 212 may be configured to measure the quality of the other RAT cell if the quality of the present cell measured by the mobile station 210 is equal to or lower than the threshold of the cell selection information.

The measurement report portion 213 transmits the result measured by the quality measurement portion 212 to the base station through a measurement report message periodically or an event-trigger method, if the mobile station 210 is in an active mode.

The cell reselection unit 214 performs a cell reselection procedure of the mobile station 210 according to the measured result or performs handover according to a command received from a measurement report checking unit 222, that is, a handover command message. In more detail, the cell reselection unit 214 performs the cell reselection procedure if the mobile station 210 is in an idle mode and performs the handover procedure if the mobile station 210 is in the active mode.

The base station 220 includes a system information transmission unit 221 and the measurement report checking unit 222.

The system information transmission unit 221 periodically transmits neighbor cell information and cell reselection information to the mobile station 210. The system information including the neighbor cell information and the cell reselection information is transmitted to the mobile station through the system information block or the measurement control message.

The measurement report checking unit 222 receives the measurement report message including the result of measuring the quality of the other RAT cell from the mobile station 210. The measurement report checking unit 222 transmits the command indicating that the mobile station 210 should perform the handover, that is, the handover command message, to the mobile station 210, if the handover of the mobile station 210 is necessary according to the measured result included in the measurement report message.

Figure 3:
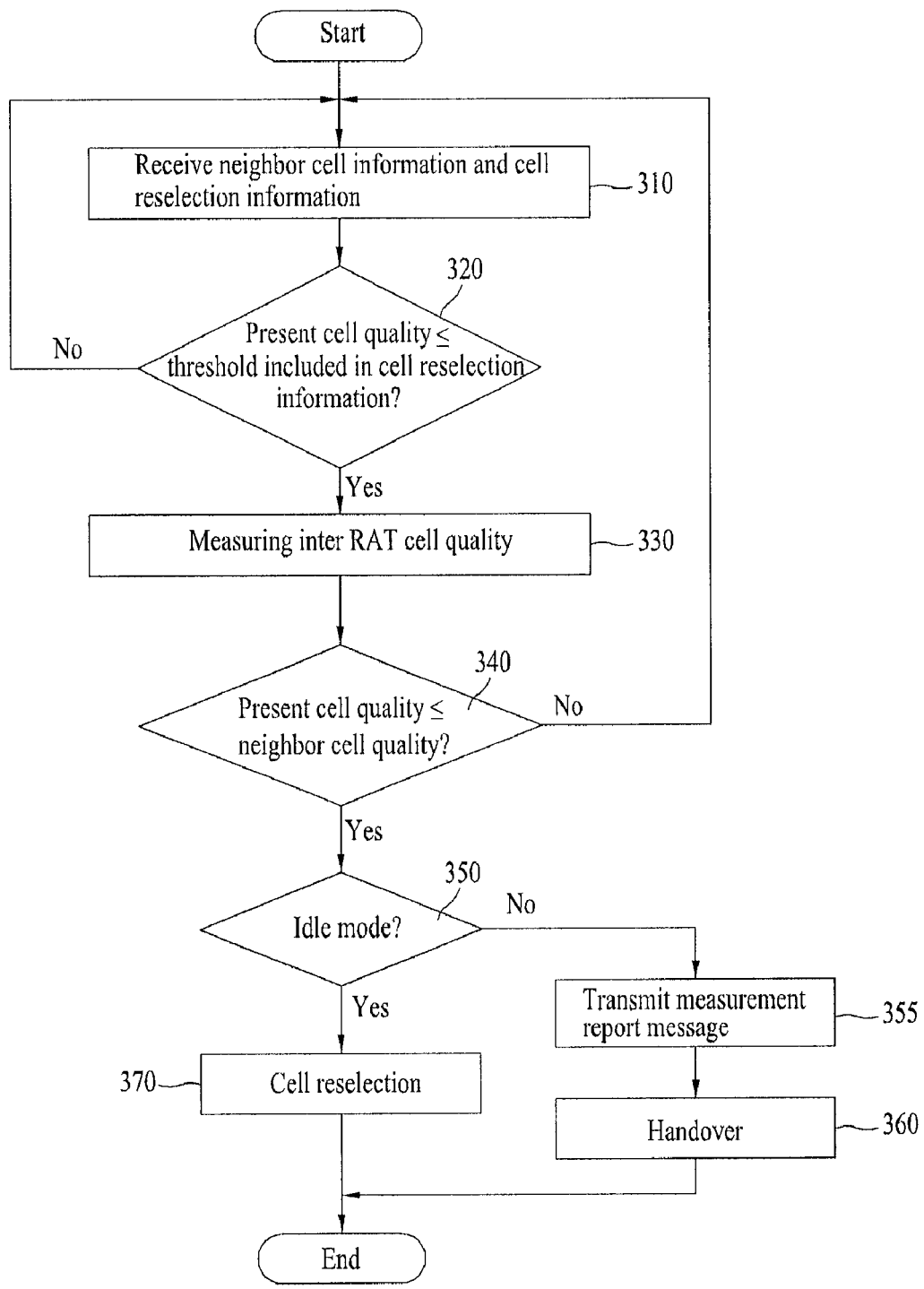
FIG. 3 is a flowchart illustrating a method for supporting mobility of a mobile station according to an embodiment of the present invention.

FIG. 3 is a flowchart illustrating a method for supporting mobility of a mobile station according to an embodiment of the present invention.

The mobile station receives neighbor cell information and cell reselection information from a base station of a present cell (step 310). The neighbor cell information includes downlink frame information of the other RAT cell and the cell reselection information includes thresholds for determining whether or not the quality of the other RAT cell shall be measured.

Next, it is determined whether or not the mobile station shall measure the quality of the other RAT cell using the thresholds of the cell reselection information (step 320). That is, if the quality of the present cell checked by the mobile station is equal to or lower than the threshold of the cell selection information, it is determined that the quality of the other RAT cell would be measured and, if the quality of the present cell measured by the mobile station exceeds the threshold of the cell selection information, the step (step 310) of, at the mobile station, receiving the neighbor cell information and the cell reselection information from the base station of the present cell is repeated.

If it is determined that the mobile station would measure the quality of the other RAT cell, the mobile station measures the quality of the other RAT cell while the signal of the other RAT cell is received (step 330).

Next, it is determined whether cell reselection or a quality measurement report shall be performed according to the quality information of the neighbor cell measured by the mobile station (step 335). That is, if the quality of the present cell checked by the mobile station exceeds the quality of the neighbor cell measured by the mobile station, the step (step 310) of, at the mobile station, receiving the neighbor cell information and the cell reselection information from the base station of the present cell is repeated. In contrast, if the quality of the present cell checked by the mobile station is equal to or lower than the quality of the neighbor cell measured by the mobile station, the method progresses to a next step (step 350) of reporting the cell reselection or the quality measurement.

Next, it is checked whether the mobile station is in an idle mode (step 350). If the mobile station is in an active mode, the result measured by the mobile station is included in a measurement report message and the measurement report message is transmitted to the base station (step 355). The base station receives the measurement report message from the mobile station and determines whether the handover shall be performed with respect to the mobile station according to the measured result included in the measurement report message. If the base station transmits the command indicating that the handover should be performed, that is, the handover command message, to the mobile station, the mobile station performs handover into the neighbor cell (step 360). In this step (step 360), the mobile station may use the neighbor cell information which is previously received from the base station.

In contrast, if the mobile station is in the idle mode, the cell reselection using the neighbor cell information is performed (step 370). Even in this step (step 370), the mobile station may use the neighbor cell information which is previously received from the base station.

Hereinafter, a WiMAX network will be, for example, described as the other RAT cell.

The neighbor cell information and the cell reselection information are transmitted in a state of being included in the system information block or the measurement control message transmitted in the E-UTRAN network as information elements.

Figure 4A:
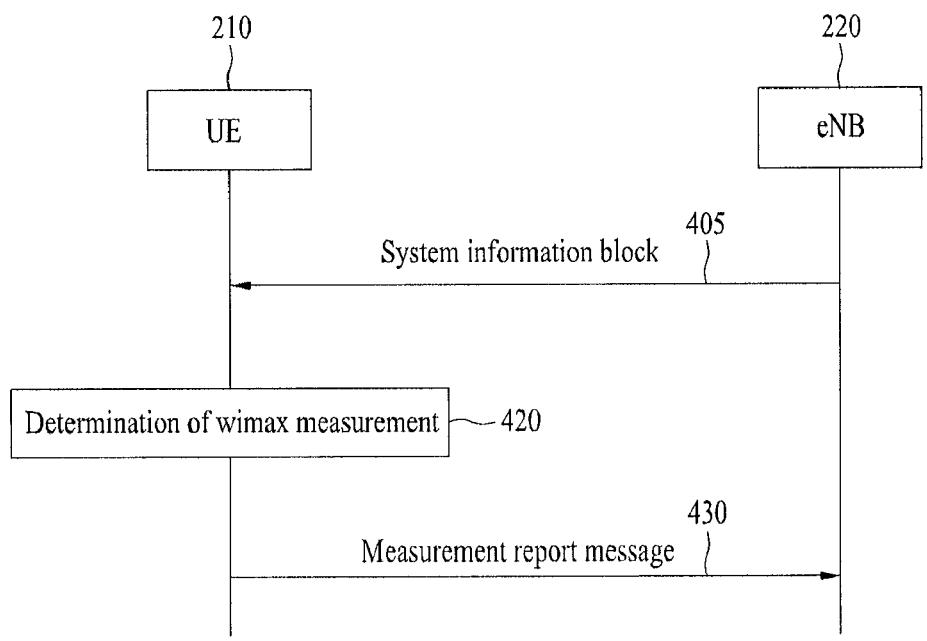
FIG. 4A is a view showing an example in which a mobile station receives a system information block and triggers a measurement report message, according to an embodiment of the present invention.

FIG. 4A is a view showing an example in which a mobile station receives a system information block transmitted by the E-UTRAN base station and triggers a measurement report message.

The E-UTRAN base station 220 transmits the system information block including the present cell information and the neighbor cell information to the mobile station 210 (405).

In the E-UTRAN, the base station may provide WiMAX system information to the mobile station. In order to allow the mobile station to be moved from the E-UTRAN network to the WiMAX network, necessary information of the WiMAX cell should be previously received through the system information in the E-UTRAN network. The necessary information may be received through two types of system information as follows.

The system information block (SIB) is a message which is periodically transmitted from the E-UTRAN base station to the mobile station and includes the WiMAX neighbor cell necessary for allowing the mobile station to be moved from the cell managed by the E-UTRAN base station to the cell managed by the WiMAX base station. The system information as the neighbor cell information may include the base station identifier (BS ID) or information necessary for synchronization, which is performed in order to receive downlink information of the WiMAX neighbor cell, as shown in Table 2. The contents included in the system information block are shown in Table 2.

TABLE 2-continued

| Name | Description |
|---|---|
| Frame Duration Code | This field indicates the periodicity of the DL frame start preamble. |
| Frame Number | Indicates the current DL Frame Number and incremented by 1 MOD $2^{24}$ each frame. |
| Other parameter | In addition, other parameter similar to those used in intra-3GPP inter-RAT idle mode mobility can also be sent on the E-UTRAN broadcast channel. |

The system information block (SIB) may include information necessary for determining whether or not the mobile station which is in the idle mode (LTE_IDLE) needs to be moved from the cell managed by the E-UTRAN base station to the cell managed by the WiMAX base station. Such information is a message which is periodically transmitted from the E-UTRAN base station to the mobile station. The contents included in the system information block are shown in Table 3.

TABLE 3

| Name | Description |
|---|---|
| WiMAX RAT Identifier | This field contains the identifier of WiMAX RAT among the RAT IDs (e.g. GSM, CDMA 20001X, etc). |
| WiMAX Start Measuring E-UTRAN Signal Quality Threshold | This field contains the threshold of the signal quality of the current cell to trigger WiMAX measurements |
| WiMAX Start Measuring E-UTRAN Rx Power Strength Threshold | This field contains the threshold of the Rx Power Strength of the current cell to trigger WiMAX measurements |

TABLE 2

| Name | Description |
|---|---|
| WiMAX RAT Identifier | This field contains the identifier of WiMAX RAT among the RAT IDs (e.g. GSM, CDMA 20001X, etc). |
| NAP ID | NAP (Network Access Provider) is a business entity that provides WiMAX radio access infrastructure to one or more WiMAX Network Service Providers (NSPs). |
| NSP ID | NSP (Network Service Provider) is a business entity that provides IP connectivity and WiMAX services to WiMAX subscribers compliant with the Service Level agreement it establishes with WiMAX subscribers. |
| BS ID | BS (Base Station) ID is a global unique identifier for a WiMAX base station. |
| MAC Version | MAC Version specifies the version of IEEE 802.16 to which BS or MS. |
| System Version | This indicates the Mobile WiMAX release as specified by the WiMAX Forum Mobile Air Interface System Profile. |
| QoS Levels Supported | QoS level which is supported in WiMAX cell (e.g. Real time service or Non-Real time service etc). |
| DL center carrier frequency of WiMAX neighbouring cells | Identifies the DL center carrier frequency of WiMAX neighboring cells. DL center carrier frequency shall be a multiple of 250 kHz. |
| Bandwidth | Identifies the size of cell bandwidth (the difference between the highest and lowest frequencies available for network signals. It is also used to describe the amount of data that can be transmitted in a fixed amount of time). |
| FFT size | Indicates the FFT sizes supported by the MS. |
| Preamble index | Identifies the PHY-specific Preamble for the WiMAX neighboring BS. |

The mobile station 210 which receives the system information block from the base station 220 checks whether the quality of the present cell in the contents of the system information block satisfies the following condition (420).

The thresholds for determining whether or not the condition is satisfied include a WiMAX start measuring E-UTRAN signal quality threshold (hereinafter, referred to as a first threshold) and a WiMAX start measuring E-UTRAN receiver (Rx) power strength threshold (hereinafter, referred to as a second threshold).

That is, if the measured signal quality of the present cell (serving cell) is equal to or lower than the first threshold or if the measured Rx power strength of the serving cell is equal to or lower than the second threshold, the measurement of the WiMAX cell is started.

The mobile station 210 collects the WiMAX neighbor cell information, includes the WiMAX neighbor cell information in the measurement report message, and transmits the measurement report message to the base station 220 (430).

The WiMAX neighbor cell information may be added to the measurement control message transmitted from the E-UTRAN base station to the mobile station such that the mobile station performs the measurement by another method for transmitting the system information including the WiMAX neighbor cell information.

Figure 4B:
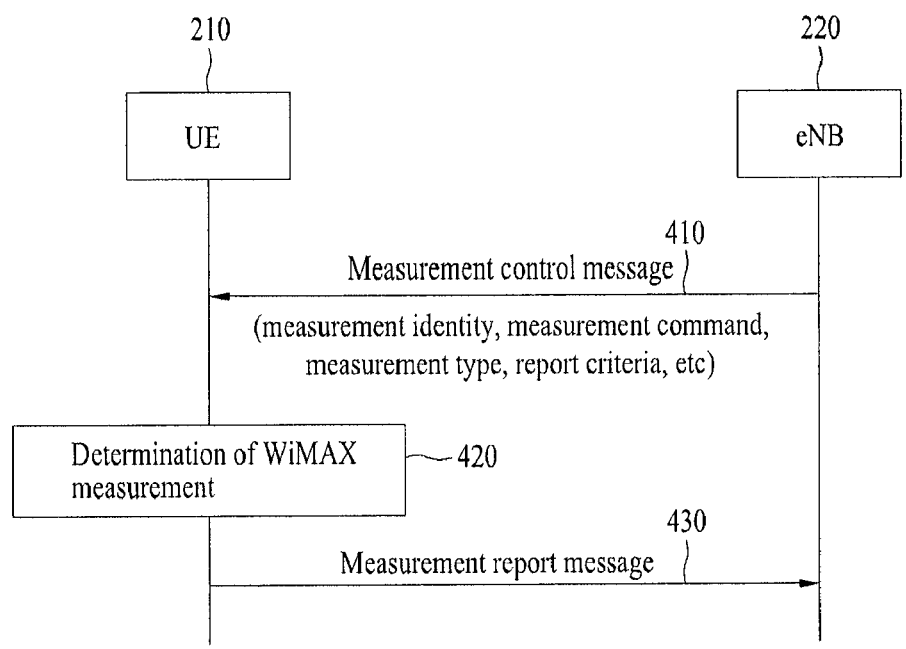
FIG. 4B is a view showing an example in which a mobile station receives a measurement control message and triggers the measurement control message, according to an embodiment of the present invention.

FIG. 4B is a view showing an example in which a mobile station receives a measurement control message transmitted by the E-UTRAN base station and triggers the measurement control message.

The E-UTRAN base station 220 includes information, which is desired to be reported by the mobile station 210, in the measurement control message and transmits the measurement control message to the mobile station (410).

The mobile station 210 checks the measurement control message received from the base station 220 and determines whether or not the attribute of the WiMAX neighbor cell shall be measured (420). Similarly, the determination whether or not the attribute of the WiMAX neighbor cell shall be measured uses the first threshold and the second threshold as described above.

The mobile station measures the signal quality and the Rx power strength from the signal transmitted by the E-UTRAN base station managed by the cell in which the mobile station is registered. The mobile station compares the measured value and the thresholds in the system information block received from the E-UTRAN base station, that is, the first threshold and the second threshold, and determines whether the information (e.g., the signal quality and the Rx power strength) of the WiMAX neighbor cell shall be measured or only the present cell information shall be continuously measured.

The mobile station 210 measures the attribute of the WiMAX neighbor cell according to the contents of the measurement control message, includes the attribute in the measurement report message, and transmits the measurement report message to the E-UTRAN base station (430).

If the quality (e.g., the signal quality and the Rx power strength) of the present E-UTRAN cell is equal to or lower than the threshold included in the system information block, the mobile station measures the WiMAX neighbor cell information and reports the WiMAX neighbor cell information to the base station. The base station checks the measured result reported from the mobile station and performs handover of the mobile station into the WiMAX neighbor cell if the quality of the WiMAX neighbor cell is higher than that of the base station of the present cell.

In particular, in the embodiment of the present invention, the base station provides parameters such as a bandwidth, a preamble index, a frame duration code, a frame number and an FFT size to the mobile station.

The mobile station may acquire information used for a process of reading a preamble of a WiMAX frame through preamble index information. The mobile terminal may acquire a receive signal strength indicator (RSSI) and a carrier-to-interference-and-noise ratio (CINR) of the WiMAX cell after decoding the preamble, and read DL-MAP information of FIG. 5C necessary for DL synchronization. For example, if the mobile station acquires the preamble index, the mobile station can know a code "series to modulate" of FIG. 5A. The mobile station analyzes the code so as to recognize a cell ID and a segment, that is, a sector. In FIG. 5B, if the preamble index is 0, the mobile station reads only the preamble corresponding to a segment 1 of a cell 1. FIG. 5C is a view showing an example of the structure of a WiMAX frame including the preamble and the DL-MAP which is the information for downlink synchronization. The mobile station may readily perform synchronization for receiving the downlink information of the WiMAX network through the DL-MAP information after decoding the preamble.

The mobile station can recognize DL carrier allocation information. The DL carrier allocation information facilitates the reception of the DL information. The mobile station can know the following DL carrier allocation through the FFT size. That is, the mobile station can know the number of DC subcarriers, the number of guard subcarriers, the number of all subcarriers within a symbol, pilots, the number of data subcarriers, the number of data subcarriers per subchannel, the number of subchannels through the FFT size.

FIG. 6 is a view showing an example of the structure of a system information block (SIB) in the case where the neighbor cell information and the cell reselection information are added to the system information block (SIB).

The transmission of the system information for the cell selection and cell reselection from the E-UTARN network to the WiMAX network uses a method for adding information elements to the system information block (SIB) used in the E-UTRAN, and the system information may be transmitted to the mobile station through an SIB3 message. The transmission of the system information including the WiMAX neighbor cell uses a method for adding the information elements to the system information used in the E-UTRAN, and the system information may be transmitted to the mobile station through a SIB5 message.

Meanwhile, if the neighbor cell information and the cell reselection information are included in the measurement control message, the procedure of collecting the parameters of the measurement control message by the mobile station is changed. The meanings of the parameters of the measurement control message are shown in Table 4.

TABLE 4

| Name | Description |
| --- | --- |
| Measurement Identity | Identifier to discriminate the measurement report message. |
| Measurement Command | Indicates the purpose of measurement report message (e.g. Setup, Modify, Delete) |
| Measurement Type | Indicates the measurement type. (e.g. Intra frequency measurement, Inter frequency measurement, Inter RAT Measurement) |
| Report Criteria | Indicates the Event (e.g. Event3a, Event3b, Event3c, Event3d). |
| Other Information | Cell list, Physical channel information elements, etc. |

Hereinafter, a process of measuring the quality of the neighbor RAT cell and reporting the measured result will be described in detail.

In order to allow the mobile station to be moved from the E-UTRAN network to the WiMAX network, the mobile station should measure the attribute (e.g., the signal quality and the Rx power strength) of the WiMAX cell. This measurement can be performed in the idle (LTE_IDLE) mode and the active (LTE_ACTIVE) mode. The idle (LTE_IDLE) mode and the active (LTE_ACTIVE) mode described herein are as follows.

The idle (LTE_IDLE) mode indicates the mode in which the mobile station has only minimum information in order to perform the communication between the mobile station and the E-UTRAN base station. In order to transmit a message of an upper layer between the mobile station and the base station, the mode should transition to the active (LTE_ACTIVE) mode. The supporting of the mobility in the idle (LTE_IDLE) mode is performed by the cell reselection.

The active (LTE_ACTIVE) mode indicates the mode in which the mobile station has all information necessary for performing the communication between the mobile station and the E-UTRAN base station, that is, the mode in which the message of the upper layer can be transmitted between the mobile station and the base station. The supporting of the mobility in the active (LTE_ACTIVE) mode is performed by handover.

The mobile station which is in the idle (LTE_IDLE) mode in the E-UTRAN network may measure a specific attribute of the E-UTRAN cell and the WiMAX cell in order to perform the cell reselection, and schedule a DRX duration such that a receiver is turned off (DRX off duration) in a predetermined period so as to reduce power consumption. It is determined whether or not the mobile station shall measure the attribute of the WiMAX neighbor cell, by at least one of the first threshold or the second threshold.

An example of the rule of measuring and stopping the attribute of the WiMAX neighbor cell by the mobile station is as follows.

First, if the measured signal quality of the serving cell is equal to or lower than the first threshold or if the measured Rx power strength of the serving cell is equal to or lower than the second threshold, the measurement of the WiMAX cell is started.

During the measurement of the WiMAX cell, if the measured signal quality of the serving cell is higher than the first threshold or if the measured Rx power strength of the serving cell is higher than the second threshold, the measurement of the WiMAX cell is stopped.

Even in the mobile station which is registered in the E-UTRAN network is currently in the active (LTE_ACTIVE) mode, the same rule is applied similar to the mobile station which is in the idle (LTE_idle) mode, and the necessary information of the WiMAX cell is measured.

When the mobile station which is in the active (LTE_ACTIVE) mode measures the WiMAX cell information, a measurement gap is required. The measurement gap indicates information for scheduling duration which can measure the information about the serving base station or another network for a predetermined period of time while the mobile station communicates with the serving base station. The mobile station which is registered in the E-UTRAN network can measure the WiMAX cell information according to the duration scheduled in the measurement gap. The measuring method of the mobile station in the active (LTE_ACTIV) mode may be changed according to the capability (UE capability) of the mobile station. For example, if the mobile station is a single receiver, that is, if the mobile station cannot simultaneously receive signals of two networks, the measurement gap is required. If the mobile station is a dual receiver, that is, if the mobile station can simultaneously receive the signals of the two networks, the signal of the other RAT cell except the network in which the mobile station is currently registered can be received or measured without the measurement gap.

The mobile station which is in the active (LTE_ACTIVE) mode measures the RSSI and the CINR of the WiMAX neighbor cell. The mobile station may classify the WiMAX neighbor cell using a WiMAX neighbor cell list included in the measurement control message and the system information received from the base station. The mobile station may transmit the measured RSSI or CINR to the WiMAX neighbor cell through the measurement report message, and may transmit the measurement report only when the measured RSSI or CINR exceeds a specific threshold. In addition, the transmission of the measurement report message may use both a method for periodically transmitting the message from the mobile station to the base station and a method for reporting the message when a specific event is generated. The event which can trigger the inter RAT measurement report will now be described.

That is, the event includes a case where the estimated quality of the serving system is equal to or lower than a specific threshold and the estimated quality of the target system is higher than the specific threshold (event 3a), a case where the estimated quality of the target system is equal to or lower than the specific threshold (event 3b), a case where the estimated quality of the target system is higher than the specific threshold (event 3c), and a case where a best cell is changed in the target system (event 3d).

The mobile station may control the transmission amount of the measurement report message using a hysteresis parameter and a time-to-trigger parameter.

Figure 7:
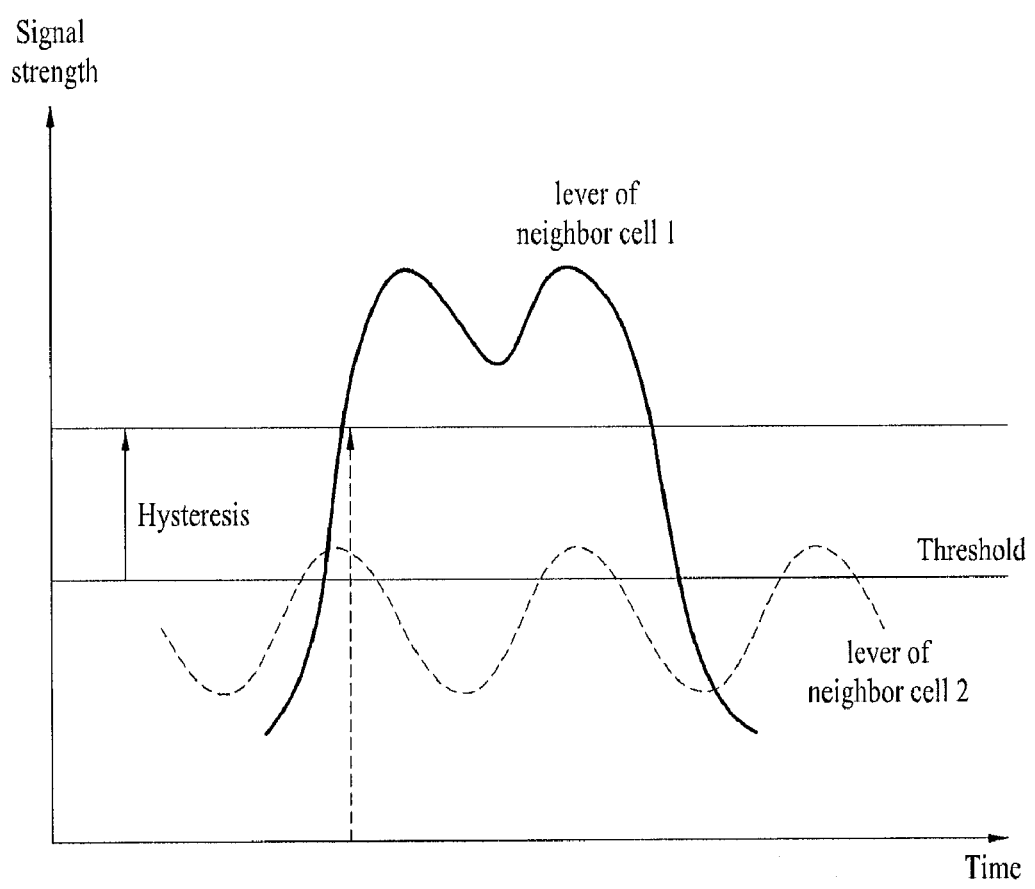
FIG. 7 is a graph showing a method for adjusting the amount of measurement report message in consideration of a hysteresis margin according to an embodiment of the present invention.

As shown in FIG. 7, only when the signal strength of the neighbor cell 1 is higher than a hysteresis margin although higher than the threshold, the event 3a is triggered and the measurement report message is transmitted, thereby adjusting the amount of message.

Figure 8:
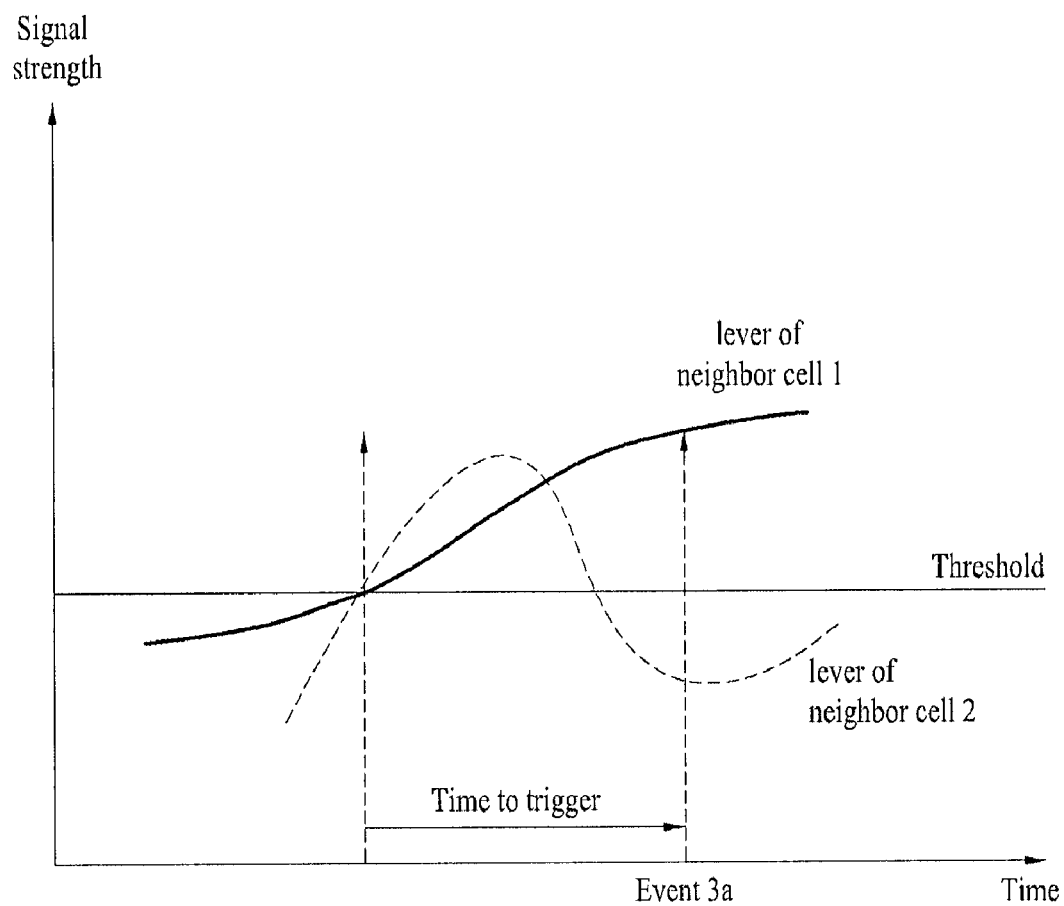
FIG. 8 is a graph showing a method for adjusting the amount of measurement report message in consideration of a time-to-trigger parameter according to an embodiment of the present invention.

FIG. 8 is a graph showing a method for adjusting the transmission of measurement report message in consideration of a time-to-trigger parameter according to an embodiment of the present invention. As shown in FIG. 8, when the signal strength of the neighbor cell 1 is higher than the threshold for a period of time corresponding to the time-to-trigger parameter although being higher than the threshold, the event 3a is triggered and the measurement report message is transmitted, thereby adjusting the amount of message.

As described above, the mobile station receives the neighbor cell information and the cell reselection information from the base station before being moved to the WiMAX cell and previously acquires the WiMAX neighbor cell such that the mobile station is readily moved from the E-UTRAN network to the WiMAX network and a time consumed for the movement of the mobile station is reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

The present invention is applicable to an inter radio access technology (RAT), and more particularly, to an access algorithm of an E-UTRAN network which is provided in the 3GPP and apparatuses associated therewith, such as a mobile station and a base station.

The invention claimed is:

1. A method of supporting mobility between an evolved Universal Mobile Telecommunication System (UMTS) terrestrial radio access network (E-UTRAN) and a cell of a different radio access technology (RAT), the method comprising:

receiving cell reselection information and neighbor cell information from a base station (BS) of a present cell, wherein the cell reselection information includes thresholds for determining whether or not a quality of the cell of the different RAT shall be measured, wherein the neighbor cell information includes a frame duration code and a frame number of a downlink frame in the cell of the different RAT, wherein the frame duration code indicates a start preamble of the downlink frame;

determining whether or not a mobile station (MS) shall measure the quality of the cell of the different RAT using the thresholds; and measuring the quality of the cell of the different RAT and reselecting a cell or transmitting a measured result to the BS through a measurement report message according to the measured result, if it is determined that the MS shall measure the quality of the cell of the different RAT, wherein transmitting the measured result through the measurement report message comprises adjusting, by the MS, a transmission frequency of the measurement report message using at least a hysteresis parameter or a time-to-trigger parameter, wherein the hysteresis parameter is used when the hysteresis parameter is higher than the thresholds, and wherein the time-to-trigger parameter is used when the quality of the cell of the different RAT is higher than the thresholds and a quality of the present cell is equal to or lower than the thresholds.

2. The method of claim 1, wherein the neighbor cell information further includes at least bandwidth information, a preamble index or an FFT size, wherein the bandwidth information indicates a cell bandwidth size of the cell of the different RAT, and wherein the preamble index indicates a specific preamble of a physical layer in the cell of the different RAT.

3. The method of claim 1, wherein determining whether or not the MS shall measure the quality of the cell of the different RAT comprises determining that the MS shall measure the quality of the cell of the different RAT if a signal quality of the present cell is equal to or lower than a signal quality threshold or a Rx power strength of the present cell is equal to or lower than an Rx power strength threshold.

4. The method of claim 1, further comprising:
receiving a handover command message from the BS; and
performing handover into the cell of the different RAT.

5. The method of claim 1, wherein the cell of the different RAT is a World Interoperability for Microwave Access (WiMAX) cell.

6. A method of supporting mobility between an evolved Universal Mobile Telecommunication System (UMTS) terrestrial radio access network (E-UTRAN) and a cell of a different radio access technology (RAT), the method comprising:
transmitting cell reselection information and neighbor cell information from a base station (BS) to a mobile station (MS) periodically, wherein the cell reselection information includes thresholds for determining whether or not a quality of the cell of the different RAT shall be measured, wherein the neighbor cell information includes a frame duration code and a frame number of a downlink frame in the cell of the different RAT, wherein the frame duration code indicates a start preamble of the downlink frame;
receiving, by the BS, a measurement report message which includes a result of measuring the quality of the cell of the different RAT according to the thresholds; and
transmitting, to the MS, a command which indicates a handover of the MS according to the result of measuring,
wherein a reception frequency of the measurement report message is based on at least a hysteresis parameter or a time-to-trigger parameter,
wherein the reception frequency is based on the hysteresis parameter when the hysteresis parameter is higher than the thresholds, and
wherein the reception frequency is based on the time-to-trigger parameter when the quality of the cell of the different RAT is higher than the thresholds and a quality of a present cell is equal to or lower than the thresholds.

7. The method of claim 6, wherein the neighbor cell information and the cell reselection information are transmitted in a way such that information elements are added to a system information block transmitted from the BS to the MS periodically.

8. The method of claim 6, wherein the cell reselection information and the neighbor cell information are transmitted in a way such that system information is added to a measurement control message transmitted from the BS to the MS periodically, wherein the system information includes the cell reselection information and the neighbor cell information.

9. The method of claim 6, wherein the neighbor cell information further includes at least bandwidth information, a preamble index or an FFT size, wherein the bandwidth information indicates a cell bandwidth size of the cell of the different RAT, and wherein the preamble index indicates a specific preamble of a physical layer in the cell of the different RAT.

10. The method of claim 6, wherein the cell of the different RAT is a World Interoperability for Microwave Access (WiMAX) cell.

11. A mobile station supporting mobility between an evolved Universal Mobile Telecommunication System (UMTS) terrestrial radio access network (E-UTRAN) and a cell of a different radio access technology (RAT), the mobile station comprising:
a system information receiving portion configured to receive cell reselection information and neighbor cell information from a base station (BS) of a present cell periodically, wherein the cell reselection information includes thresholds for determining whether or not a quality of the cell of the different RAT shall be measured, wherein the neighbor cell information includes a frame duration code and a frame number of a downlink frame in the cell of the different RAT, wherein the frame duration code indicates a start preamble of the downlink frame;
a quality measurement portion configured to measure the quality of the cell of the different RAT if it is determined that the quality of the cell of the different RAT shall be measured according to the thresholds; and
a measurement report portion configured to transmit a result of measuring the quality of the cell of the different RAT to the BS through a measurement report message,
wherein the measurement report portion is further configured to transmit the result of measuring by adjustinq a transmission frequency of the measurement report message using at least a hysteresis parameter or a time-to-trigger parameter,
wherein the hysteresis parameter is used when the hysteresis parameter is higher than the thresholds, and
wherein the time-to-trigger parameter is used when the quality of the cell of the different RAT is higher than the thresholds and a quality of the present cell is equal to or lower than the thresholds.

12. The mobile station of claim 11, wherein the quality measurement portion is further configured to measure the quality of the cell of the different RAT according to a duration scheduled in a measurement gap registered in the mobile station and the BS if the mobile station is in an active mode.

13. The mobile station of claim 11, wherein the mobile station is a dual receiver which is able to receive signals of the E-UTRAN and the cell of the different RAT simultaneously.

* * * * *